Feb. 18, 1958     R. PHELPS, JR     2,824,223
PENTODE-TRIODE PLATE-COUPLED ONE-SHOT MULTIVIBRATOR
Filed March 30, 1954
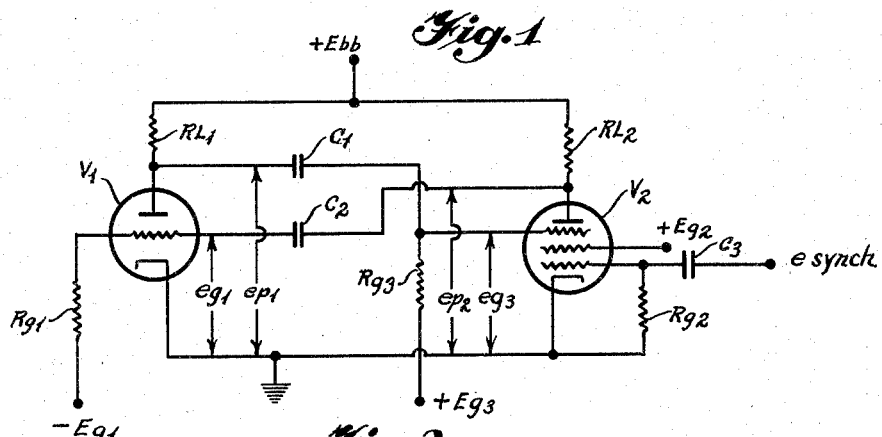
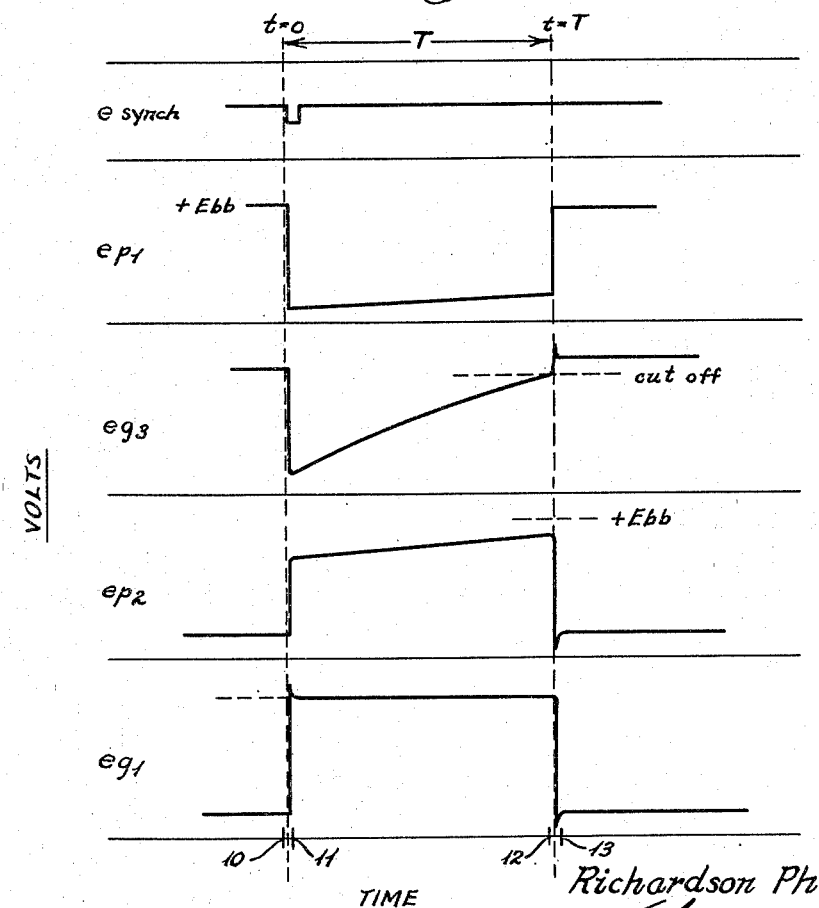
INVENTOR
Richardson Phelps, Jr.
BY
ATTORNEYS

United States Patent Office 2,824,223
Patented Feb. 18, 1958

2,824,223

PENTODE-TRIODE PLATE-COUPLED ONE-SHOT MULTIVIBRATOR

Richardson Phelps, Jr., United States Navy, assignor to the United States of America as represented by the Secretary of the Navy Application March 30, 1954, Serial No. 419,940

10 Claims. (Cl. 250—27)

(Granted under Title 35, U. S. Code (1952), sec. 266)

This invention relates to a one-shot pentode-triode plate-coupled multivibrator.

The conventional plate-coupled one-shot multivibrator usually employs two triodes. The triggering system employed with this type of multivibrator requires an additional triggering tube and a relatively high positive triggering voltage. In this conventional type of multivibrator circuit there was no way of isolating the trigger injection circuit from the multivibrator without using a separate triggering tube.

It is accordingly an object of this invention to provide a multivibrator circuit which allows complete isolation of the trigger input circuit without using a separate triggering tube.

It is a further object of this invention to utilize a triggering pulse of small negative amplitude instead the relatively high positive voltage which is used in conventional multivibrator circuits.

It is still a further object of the invention to present a multivibrator circuit in which the period may be changed by changing one of the inputs to the circuit and without disturbing the constants of the circuit.

Other objects and many of the attendant advantages of this invention will be readily appreciated as the same becomes better understood by reference to the following detailed description when considered in connection with the accompanying drawings wherein:

Fig. 1 is a circuit diagram of the pentode-triode one-shot multivibrator.

Fig. 2 is a diagram which pictorially depicts the waveforms of the voltages of various parts of the circuit against a time base.

In Fig. 1 is shown an arrangement of a triode-pentode plate coupled multivibrator. Triode $V_1$ and pentode $V_2$ are cathode coupled and connected to ground. The plates of $V_1$ and $V_2$ are connected to a positive voltage $E_{bb}$ through load resistor $RL_1$ and $RL_2$ respectively. The plate of $V_2$ is coupled to the grid of $V_1$ through capacitor $C_2$ and the plate of $V_1$ is coupled to the suppressor grid of $V_2$ through capacitor $C_1$. The suppressor grid of $V_2$ is connected to a positive source of voltage $+Eg_3$ through resistor $Rg_3$. A negative biasing voltage $-Eg_1$ is impressed on the grid of triode $V_1$ through resistor $Rg_1$. A positive voltage $+Eg_2$ is impressed on the screen grid of pentode $V_2$. The trigger input $e_{synch}$ is impressed on the control grid of pentode $V_2$ through capacitor $C_3$. The control grid of pentode $V_2$ is coupled to the cathode of $V_2$ through resistor $Rg_2$. The operating values for a typical system will be summarized at the end of this specification.

For the purpose of further describing the instant invention in a most expedient manner reference will be made to Figs. 1 and 2 together.

When the trigger supply voltages $e_{synch}$ is applied to the circuit, tube $V_1$ is non-conducting and $V_2$ is conducting heavily. The voltages at this time for the various parts of the circuit are depicted by time 10, in Fig. 2. When the negative trigger pulse $e_{synch}$ is applied to the control grid of $V_2$ through capacitor $C_3$, the plate current is greatly reduced and the plate voltage of $V_2$ rises. This rising plate voltage of pentode $V_2$ is applied to the grid of triode $V_1$ through capacitor $C_2$. The increased voltage on the grid of triode $V_1$ causes this tube to start conducting. When triode $V_1$ starts to conduct the plate voltage of triode $V_1$ is caused to fall; and this falling voltage is impressed on the suppressor grid of pentode $V_2$ through capacitor $C_1$. The negative going voltage on the suppressor grid of $V_2$ causes further reduction of the plate current in pentode $V_2$ thereby further raising the plate voltage of $V_2$. This action in turn further raises the grid voltage of triode $V_1$, causing more current to flow in $V_1$, and thereby lowering the plate voltage of triode $V_1$. This switching action is very rapid and results in $V_1$ being heavily conducting and $V_2$ being cut off due to its low suppressor voltage. At this instant of the cycle, the voltages of the various components of the circuit are shown in Fig. 2 at time 11.

At this time 11 the suppressor voltage, $eg_3$ starts its exponential rise toward voltage $Eg_3$ with time constant $(Rg_3+RL_1)(C_1)$. When the suppressor voltage $eg_3$ rises to to cut off value at time 12, Fig. 2, pentode $V_2$ starts to conduct. This causes the plate voltage of $V_2$ to drop which in turn causes the grid voltage of triode $V_1$ to drop by way of capacitor $C_2$. As this occurs, the plate voltage of triode $V_1$ is raised. Since capacitor $C_1$ couples the plate of triode $V_1$ to the suppressor grid of pentode $V_2$, the suppressor voltage of $V_2$ is raised as the plate voltage of triode $V_1$ is raised. This process continues rapidly until triode $V_1$ is cut off and pentode $V_2$ is again heavily conducting. This condition is represented by time 13 in Fig. 2. The circuit remains in this quiescent condition until the arrival of the next trigger pulse. In Fig. 2 the start of the cycle is at time $t=0$. The cycle duration is for time, $t=T$, as shown in the diagram.

The operation of the circuit is stable and is relatively independent of changes in the tubes, components, or operating voltages. Pulse duration can be controlled over a relatively wide range by varying voltage $Eg_3$. For example, by adjusting $Eg_3$ so that its voltage is zero without changing the other components of the circuit which are listed at the end of the specification, the period of the circuit is 920 microseconds. At a value of $Eg_3=+250$ v. the period equals 120 microseconds. Furthermore, in the described circuit the trigger pulse required is only from $-1.7$ to $-2.0$ volts. The trigger pulse has only to be sufficiently large to make triode $V_1$ conduct in order to start the switching action.

It can be readily seen from the above description that the trigger injection through the control grid of the pentode makes the trigger injection circuit entirely independent of the operation of the multivibrator circuit since this construction provides complete isolation of the trigger injection system.

A list of the typical component values for the instant circuit which have been found satisfactory are as follows:

| | |
|---|---:|
| $V_1$ | 12AU7 |
| $V_2$ | 5636 |
| $R_{L1}$ kilohms | 22 |
| $R_{L2}$ do | 100 |
| $Rg_1$ megohms | 1 |
| $Rg_2$ kilohms | 82 |
| $Rg_3$ megohms | 2.7 |
| $C_1$ micromicro-farads | 370 |
| $C_2$ microfarads | .01 |
| $C_3$ do | .25 |

Operating voltages for a period of 780 microseconds:

$E_{bb}$ ---------- +145 volts.
$Eg_2$ ---------- +60 volts.
$Eg_1$ ---------- −45 volts.
$Eg_3$ ---------- +60 volts.
$e_{synch}$ ---------- −1.7 volts for 60 microseconds.

Obviously many modifications and variations of the present invention are possible in the light of the above teachings. It is, therefore, to be understood that within the scope of the appended claims the invention may be practiced otherwise than as specifically described.

The invention described herein may be manufactured and used by or for the Government of the United States of America for governmental purposes without the payment of any royalties thereon or therefor.

Having thus described my invention I claim:

1. A multivibrator circuit comprising a first electronic tube having a cathode, plate, and grid, a second electronic tube having a cathode, plate, control grid, screen grid, and suppressor grid, said electronic tubes being cathode coupled to ground and being plate coupled through load resistors to a positive voltage, said screen grid being connected to a positive voltage, said suppressor grid being coupled to the plate of the first electronic tube through a capacitor, said grid of the first electronic tube being coupled to the plate of the second electronic tube through a capacitor, means for applying a negative voltage to the grid of the first electronic tube, means for applying a positive voltage to the suppressor grid, and means for applying a relatively low negative voltage to the control grid when it is desired to actuate the multivibrator.

2. A pentode-triode plate-coupled multivibrator comprising a triode having a cathode, plate, and grid, a pentode having a cathode, plate, control grid, screen grid, and suppressor grid, means coupling the cathodes of the pentode and triode to ground, means coupling the plate of the triode to the suppressor grid of the pentode, means coupling the plate of the pentode to the grid of the triode, means for impressing positive voltages on the suppressor and screen grids of the pentode, means for impressing a negative voltage on the grid of the triode, and means for impressing a relatively small negative trigger voltage on the control grid of the pentode to cause the multivibrator circuit to produce the required waveform.

3. A multivibrator circuit comprising a normally conducting pentode having a cathode, plate, control grid, screen grid, and suppressor grid, a normally non-conducting triode having a cathode, plate, and grid, said plates being coupled to a positive voltage, said cathodes being coupled to ground, means for impressing positive voltages on the suppressor and screen grids of the pentode, means for impressing a negative voltage on the grid of the triode, means connecting the plate of the pentode to the grid of the triode, means coupling the plate of the triode to the suppressor grid of the pentode, and means for impressing a negative trigger pulse on the control grid of the pentode whereby the normally conducting pentode becomes non-conducting and the normally non-conducting triode begins to conduct.

4. A one-shot multivibrator circuit comprising a normally conducting pentode having a cathode, plate, control grid, screen grid, and suppressor grid, a normally non-conducting triode having a cathode, plate, and grid, said cathodes being coupled to ground, said plates being coupled through load resistors to a positive voltage, said screen grid being connected to a positive voltage, a first capacitor coupling the plate of the triode to the suppressor grid of the pentode, a second capacitor coupling the plate of the pentode to the grid of the triode, a positive voltage connected to the suppressor grid through a resistor and means for impressing a relatively small negative trigger voltage on the control grid of the pentode whereby the normally conducting pentode is caused to become non-conducting and the normally non-conducting triode is caused to become conducting, the period of conduction of the triode being determined by the time constant of the load resistor of the triode, the capacitor coupling the plate of the triode to the suppressor grid of the pentode, and the resistance coupling the voltage source to the suppressor grid of the pentode, and the magnitude of the last mentioned voltage.

5. A one-shot multivibrator comprising a first normally non-conducting electronic tube having a cathode, plate, and grid, a second normally conducting electronic tube having at least a cathode, plate, control grid, and suppressor grid, said cathodes being coupled to each other and to ground, said plates being connected to a positive voltage through load resistors, a first capacitor connecting the plate of the first tube to the suppressor grid of the second tube, a second capacitor connecting the plate of the second tube to the grid of the first tube, a positive voltage connected to said suppressor grid across a resistor, said screen grid being connected to a positive voltage and means for applying a relatively small negative trigger pulse to the control grid of the second tube to cause said first tube to conduct, the length of time of conduction of said first tube being determined by the time constant formed by the load resistor of said first tube, the capacitor, and the resistor connecting said positive voltage to said suppressor grid, and by the magnitude of said last mentioned voltage.

6. A one-shot multivibrator comprising a normally conducting first electron tube having at least a cathode, plate, control grid, and a suppressor grid, a normally non-conducting second electron tube having at least a cathode, plate, and grid, means coupling the plate of the first tube to the grid of the second tube, a capacitor coupling the plate of the second tube to the suppressor grid of the first tube, the plates of the tubes being coupled to a positive voltage, the cathodes being coupled to ground, said screen grid being connected to a positive voltage and the control grid of the first tube being coupled to a source for supplying relatively small negative voltage pulses thereto for actuating the multivibrator circuit whereby the normally conducting tube becomes non-conducting and the normally non-conducting tube conducts, and a voltage impressed on said suppressor grid, the magnitude of said voltage determining the period of the multivibrator.

7. A one-shot multivibrator comprising a normally non-conducting triode having a cathode, plate and grid and a normally conducting pentode having a cathode, plate, control grid, screen grid, and suppressor grid; said cathodes coupled to ground and said plates coupled through load resistors to a positive voltage, the plate of the pentode being reactive coupled to the grid of the triode, capacitive means coupling the plate of the triode to the suppressor grid of the pentode, said screen grid being connected to a positive voltage, a relatively small negative voltage pulse coupled to another grid of the pentode for causing said pentode to cease conducting and to cause said triode to conduct, the length of time of conduction of the triode being dependent on the value of the capacitive means.

8. A multivibrator as set forth in claim 7 wherein a second voltage is impressed on the grid of the pentode to which the plate of the triode is coupled, the magnitude of said voltage further determining the length of time of conduction of the triode.

9. A multivibrator as recited in claim 7 wherein the capacitative means forms a part of a resistance-capacitance circuit which has a predetermined time constant.

10. A multivibrator as set forth in claim 9 wherein a second voltage is impressed on the grid of the pentode to which the plate of the triode is coupled, the magnitude of said voltage further determining the length of time of conduction of the triode.

References Cited in the file of this patent

UNITED STATES PATENTS

| | | |
|---|---|---|
| 2,114,938 | Puckle | Apr. 19, 1938 |
| 2,410,920 | Atwood | Nov. 12, 1946 |
| 2,436,482 | Miller et al. | Feb. 24, 1948 |
| 2,507,211 | Manke et al. | May 9, 1950 |
| 2,556,934 | Mulligan et al. | June 12, 1951 |
| 2,589,254 | Hoeppher | Mar. 18, 1952 |